United States Patent
Hrach

[15] 3,673,139
[45] June 27, 1972

[54] PROCESS FOR THE PRODUCTION OF INJECTION MOULDED AND EXTRUSION MOULDED POLYESTER PRODUCTS

[72] Inventor: Joseph Hrach, Kufstein/Tirol, Austria
[73] Assignee: Sandoz Ltd., Basel, Switzerland
[22] Filed: April 6, 1970
[21] Appl. No.: 26,114

[52] U.S. Cl. ............260/22 R, 260/32.4, 260/33.8 R, 260/40 R, 260/75 R, 260/DIG. 35, 260/873
[51] Int. Cl. ..................C08g 17/003, C08g 17/14
[58] Field of Search ............260/22 C, 22 A, 75 R, 873, 260/DIG. 35

[56] References Cited

UNITED STATES PATENTS

| | | | |
|---|---|---|---|
| 2,877,130 | 3/1959 | Caron et al. | 260/22 |
| 2,957,837 | 10/1960 | Smith et al. | 260/22 |
| 3,002,942 | 10/1961 | Zoetbrood | 260/22 |
| 3,223,666 | 12/1965 | Bolton | 260/29.2 |
| 3,223,752 | 12/1965 | Tate et al. | 260/873 |
| 3,321,437 | 5/1967 | Goodman et al. | 260/47 |
| 3,345,313 | 10/1967 | Ruhf et al. | 260/22 |
| 3,396,128 | 8/1968 | Matumoto et al. | 260/22 |
| 3,435,093 | 3/1969 | Cope | 260/873 |
| 3,442,868 | 5/1969 | Ogata et al. | 260/75 |
| 3,502,620 | 3/1970 | Caldwell | 260/75 |

FOREIGN PATENTS OR APPLICATIONS

| | | | |
|---|---|---|---|
| 609,795 | 10/1948 | Great Britain | 260/75 |
| 1,104,089 | 2/1968 | Great Britain | 260/75 |

*Primary Examiner*—Donald E. Czaja
*Assistant Examiner*—Ronald W. Griffin
*Attorney*—Littlepage, Quaintance, Wray & Aisenberg

[57] ABSTRACT

Process for the production of injection moulded and extrusion moulded polyesters from diols and dicarboxylic acids of which at least 85 mol. percent consists of terephthalic acid, which process consists of condensing in the polyester 0.001 to 1 mol. percent of at least one compound bearing not less than three polyester-forming functional groups, such as OH and/or COOH groups, and incorporating in the polyester, either before or during processing, 0.001 to 2 percent by weight, in relation to the total amount of monomer units, of at least one substance which promotes crystallization.

17 Claims, No Drawings

PROCESS FOR THE PRODUCTION OF INJECTION MOULDED AND EXTRUSION MOULDED POLYESTER PRODUCTS

This invention relates to a process for the production of injection moulded and extrusion moulded products of polyesters, in which the condensed acid component contains at least one acid radical selected from the group comprising terephthalic acid, iso-phthalic acid, diphenyldicarboxylic acid, diphenyl sulphone dicarboxylic acid and 2,6-naphthalenedicarboxylic acid, at least 85 mol.% of the condensed acid component being terephthalic acid radicals.

The production of polyesters and copolyesters from aromatic and/or aliphatic dicarboxylic acids or their lower dialkyl esters and aliphatic and/or cyclic diols has been known for a long time. Technically the most important polyesters are those in which the acid component consists mainly of terephthalic acid. Examples of other interesting acid components are isophthalic acid, 5-sulpho-iso-phthalic acid, diphenyldicarboxylic acid, diphenyl sulphone dicarboxylic acid, 2,6-naphthalenedicarboxylic acid, and/or adipic or sebacic acid. The most widely used diol components are ethylene glycol, 1,4-butanediol, 1,4-di-(hydroxymethylene)-cyclohexane, neopentylglycol, trimethylhexanediol and/or bis-phenol-A-diglycol ether.

Further, the use of compounds with crosslinking or branching action is known; examples are the at least tribasic carboxylic acids, alcohols, phenols, unsaturated aliphatic dicarboxylic acids and 2,5-dihydroxyterephthalic acid. These crosslinking compounds are employed in amounts of up to 5 mol.%.

Whether the reaction is effected with or without a crosslinking compound, the acid components employed to form polyesters in accordance with the present process invariably contain at least 85 mol.% of terephthalic acid radicals.

By increasing the degree of crosslinking or branching, the viscosity and the gummy elasticity of the resulting polyester melt increase; this leads to inferior processing properties, for example, in injection and extrusion moulding machinery. At the same time the injection or extrusion moulded products have greater brittleness, which renders them unserviceable for practical use, especially for technical purposes.

A crucially important property of a polyester is its crystallization behavior, which has a critical effect on processability and service properties. In order to be suitable for injection and extrusion moulding, a polyester must crystallize as rapidly and fully as is practicable to form a homogeneous, fine-grained crystal structure. Given this behavior, the mould residence times necessary for processing are shorter than otherwise, which increases the output rate and results in products with high shape and dimensional stability and good mechanical properties.

Two examples of the various means which can be utilized to improve the crystallization properties of polyesters may be mentioned:

1. the addition of inert liquids and/or solids of low molecular weight which promote crystallization;
2. the addition of other inert polymers which promote crystallization and are incompatible with polyesters, such as polyolefins, polystyrenes and copolymers of these polymers.

The process of this invention can be employed to produce injection or extrusion moulded polyester products which have superior service properties compared with known polyesters, such as are referred to above. The process consists of condensing in the polymer 0.001 to 1 mol.% of at least one compound having not less than three polyester-forming functional groups, so as to form slightly branched or crosslinked polyesters with an intrinsic viscosity of at least 0.80 or, preferably, 0.90, and incorporating in the polyester, either before or during processing by the known injection or extrusion moulding techniques, 0.001 to 2% by weight, in relation to the total amount of monomer units, of at least one substance which promotes crystallization. These crystallization promoters are inorganic or organic compounds of low molecular weight selected from the group consisting of calcium carbonate, calcium silicate, magnesium silicate, talcum powder, calcium oxalate, calcium sulphate, magnesium stearate, benzophenone, tetrahydronaphthalene, tetrachlorethane, dioxane, aniline and m-cresol. High molecular-weight polymers, such as polyolefins, polystyrenes and their copolymers, which may be additionally incorporated to promote crystallization, are added in amounts of 0.001 to 2% by weight, either simultaneously with, or independently of, the aforestated substance.

The substances employed to promote crystallization can be blended with the batch at any phase of polyester production. Alternatively, they can be mixed with the polyester during a treatment prior to injection or extrusion moulding, or melted in it in the moulding machine. The preferred modes of operation are three: incorporation during the polycondensation reaction; coating of the polyester granules with subsequent regranulation; and addition in the extrusion or injection moulding process. In this context extrusion moulding refers to the production of semi-final goods, such as rods, sheet and embossed sheet.

In the processing of polyesters previously treated as described in the foregoing, it is advisable to work at a mould temperature the same as the crystallization temperature of the polyester. Given this condition, the combined presence of the crystallization promoters and the crosslinking component imparts great readiness for crystallization, which is reflected in good processibility in injection and extrusion moulding, and in a substantial improvement in the service properties of the moulded products. By service properties are understood those which determine the level of performance of a plastic product and which it must exhibit to a given degree to fulfill its intended purpose satisfactorily. The range of service properties which is mandatory for any given article depends on the functions it has to perform and the mechanical and other forces to which it will be subjected in use. Accordingly, the values for the service properties determined by laboratory tests have to be assessed with due regard to their proximity to practical requirements, since they have to serve in place of tests under practical conditions.

The following service properties have been selected to characterize the injection and extrusion moulded products that are obtained by the process of this invention:

a. shape stability, expressed by the temperature-dependence of the elasticity modulus;
b. dimensional stability, expressed by the shrinkage value;
c. shape and dimensional stability, expressed by the values for the elasticity modulus and the shrinkage;
d. hardness, expressed by the depth of penetration of a metal ball under a specified load;
e. brittleness and toughness, expressed by the impact resistance;
f. creep resistance, expressed by the time period of resistance.

The low degree of crosslinking and branching in polyesters produced in accordance with the present process results in injection or extrusion moulded products with superior shape and dimensional stability, especially at temperatures around and above the freezing point. These products are very hard and, surprisingly, are practically equal in toughness to non-crosslinked polyesters. The low degree of crosslinking also means that they have better mechanical properties and are less temperature-dependent than non-crosslinked polyesters. This is evident from the test findings for the tensile strength in relation to temperature which are presented after Example 1. Consequently, the moulded products show less tendency to creep. The stability to chemical agents and atmospheric impurities is very good and the electrical properties are excellent.

The process of this invention is carried out by reacting with heating and stirring in a pure nitrogen atmosphere in the presence of a catalyst a mixture of terephthalic acid dimethyl ester, ethylene glycol and up to 1 mol.% of a compound bearing at least three polyester-forming functional groups, e.g. glycerol, 1,2,4-butanetriol, 1,2,5-hexanetriol, cyclohexane-1,2,3-triol, erythritol, penta-erythritol, cyclohexane-1,2,3,5-tetrol, sorbitol, tricarballylic acid, pentane-1,2,5-tricarboxylic acid, trimellitic acid, naphthalene-1,4,5-tricarboxylic acid, prehnitic acid, mellophanic acid, pyromellitic acid, dihydroxybenzoic acid, racemic acid, citric acid, gentisic acid, ribonic acid, arabonic acid; if desired the reaction melt may contain one or more bifunctional co-components, such as 1,4-butanediol, neopentylglycol, trimethylhexanediol or bis-phenol-A-diglycol ether. In the first stage of the reaction the methanol and the excess ethylene glycol are distilled off in the temperature range of up to about 250° C at atmospheric or excess-pressure. Subsequently stirring is continued at a temperature of up to about 290° C with vacuum, until a polyester with an intrinsic viscosity of at least 0.80 is formed. The substance employed to promote crystallization, e.g. calcium carbonate, calcium silicate, magnesium silicate, talcum powder, calcium oxalate, magnesium stearate or calcium sulphate, can be blended with the polyester in the reaction vessel; alternatively, after the reaction the polyester granules can be coated with the substance in amounts of up to 2% by weight and the coated granules melted and re-extruded. In both cases the melted polyester containing the crystallization promoter is extruded in the form of granules. The granules are dried to a residual moisture content of less than 0.01% by weight and processed on injection or extrusion moulding machines, with the mould temperature set at the crystallization temperature of the granules. In order to gain a further improvement in crystallization behavior, another substance promoting crystallization can be selected from the group comprising benzo-phenone, tetrahydronaphthalene, tetrachlorethane, dioxane, aniline and m-cresol, and added in an amount of up to 1% by weight on the weight of the granules before they are moulded on extrusion or injection machines.

Further additives, such as colorants, fillers, reinforcing agents, ultra-violet absorbers, lubricants and mould release agents can of course be incorporated in the polyesters prior to the moulding process.

The following Examples illustrate the invention without limiting its scope. The parts are by weight; the temperature of the maximum rate of crystallization and the melting points were determined with tempered, chilled samples using the Perkin-Elmer differential calorimeter DSC-1, the heating-up rate being 16° C per minute. The intrinsic viscosities were determined with solutions of 0.5 g polyester in 100 ml of a mixture of equal parts of phenol and tetrachlorethane at 25° C.

EXAMPLE 1

In a pure nitrogen atmosphere a mixture of 4,000 parts of terephthalic acid dimethyl ester, 2,800 parts of ethylene glycol and 5.6 parts of penta-erythritol is reacted with heating and stirring in the presence of 1 part of calcium in glycol solution and 1.2 parts of a finely pulverized 60:40 antimony-lead alloy. The methanol and excess ethylene glycol distill off at temperatures up to 220° C. After the addition of 5 parts of dry, finely pulverized calcium carbonate, vacuum is applied and the temperature increased to 270° C. The polycondensation reaction is conducted at this temperature for 3 hours at a vacuum pressure of 0.5 Torr., after which the polyester melt is extruded in ribbon form and cut into chips. This polyester melts at 259° C; its crystallization temperature is 131° C, the freezing point 76° C and the intrinsic viscosity 0.93. The chips are dried to a residual moisture content of about 0.005% by weight and processed on a screw-type injection moulding machine at a mould temperature of about 135° C and a mould residence time of 30 seconds.

Specimen mouldings (drawn rod as specified in ASTM 638, small standard rod as in DIN 53453) were made for testing. They are crystalline (average density 1.38 g/cm³), have a fine, homogeneous structure and an intrinsic viscosity of the order of 0.87–0.88. For the purpose of comparison, the test findings for a non-crosslinked, but otherwise identical, polyester are listed in the table.

|  |  | Crosslinked polyester | Non-crosslinked polyester |
|---|---|---|---|
| Tensile strength at (ASTM D 638) | 23°C | 780 kp/cm² | 750 kp/cm² |
|  | 70°C | 420 " " | 410 " " |
|  | 80°C | 320 " " | 300 " " |
|  | 100°C | 200 " " | 150 " " |
|  | 120°C | 160 " " | 110 " " |
| Elasticity modulus (of binding strength tests) at (ASTM D 790) | 23°C | 31000 kp/cm² | 29000 kp/cm² |
|  | 70°C | 20000 " " | 15000 " " |
|  | 80°C | 9000 " " | 6500 " " |
|  | 100°C | 3400 " " | 2200 " " |
|  | 120°C | 2500 " " | 1600 " " |
|  | 140°C | 2500 " " | 1400 " " |
| Impact resistance at (DIN 53453) with striking pendulum 0.4 as in (DIN 51222) | 23°C | no breakage | no breakage |
| Surface hardness (DIN 53456) after application of pressure for 10 seconds |  | 1720 kp/cm² | 1620 kp/cm² |
| after application of pressure for 60 seconds |  | 1590 kp/cm² | 1470 kp/cm² |

The non-crosslinked and the crosslinked specimens show no shrinkage after exposure to dry air at 140° C for 2 hours.

EXAMPLE 2

A polyester is produced by the normal polycondensation process with dimethyl terephthalate, ethylene glycol and 0.2 mol.% of penta-erythritol on the weight of the dimethyl terephthalate. A 160 kilogram charge of the granules, which have an intrinsic viscosity of 0.90, is dried in a tumbler drier to a moisture content of less than 0.01% by weight, intimately mixed in the same drier with 800 grams of benzophenone, and moulded on a screw-type injection moulding machine at a mould temperature of about 140° C and a mould residence time of 40 seconds in the form of flat panels with the dimensions 120 × 10 × 4 mm. The panel is of finely crystalline structure with a density of 1.375 g/cm³.

The moulded product was tested for shape stability at high temperature, as follows. A specimen panel was placed between two blade-shaped plates at a distance of 100 mm from each other, with the narrow sides touching the blades, and loaded at the center with a bending stress of 18.5 kp/cm³. The apparatus was heated up on an oil bath at the rate of 2° C per minute, and the temperature at which the flexure of the specimen amounted to 0.32 mm was determined.

This characteristic temperature was 85° C for the moulded panel produced as described above while, for a comparable panel of a polyester produced in the same way but without penta-erythritol, it was 77° C.

Having thus disclosed the invention what I claim is:

1. A polyester composition, suitable for the preparation of injection molded or extrusion molded products, which is a blend of (1) condensate of (A) an acid component of a dicarboxylic acid, (B) diol and (C) a branching promoting or crosslinking agent and (2) from 0.001 to 2 percent by weight, based on the total amount of monomer units, of a substance which promotes polyester crystallization; the condensate being characterized by (a) terephthalic acid radicals which constitute at least 85 mol% of the acid component, (b) the proportion of branching promoting or crosslinking agent which constitutes from 0.001 to 1 mol percent of the condensate and comprises at least one compound which bears at least three polyester-forming functional groups, (c) a low degree of crosslinking or branching and (d) an intrinsic viscosity of at least 0.80.

2. An injection molded or extrusion molded polyester product, the polyester of which is, prior to molding, in the form of a composition according to claim 1.

3. A product according to claim 2 wherein the composition comprises condensate having an intrinsic viscosity of at least 0.90.

4. A product according to claim 2 wherein the acid component of the condensate is that of at least one member selected from the group consisting of terephthalic acid, isophthalic acid, diphenyldicarboxylic acid, diphenylsulfonedicarboxylic acid and 2,6-naphthalenedicarboxylic acid.

5. A process for producing a product according to claim 1 which comprises (a) forming polyester with a low degree of crosslinking or branching by condensing at least one dicarboxylic acid or lower dialkyl ester thereof with polyester-forming diol and from 0.001 to 1 mol percent of at least one compound having at least three polyester-forming functional groups until resulting condensate has an intrinsic viscosity of at least 0.80 and (b) blending the polyester with from 0.001 to 2 percent by weight, based on the total amount of monomer units, of at least one substance which promotes crystallization; each dicarboxylic acid being a member selected from the group consisting of terephthalic acid, isophthalic acid, diphenyldicarboxylic acid, diphenylsulfonedicarboxylic acid and 2,6-naphthalenedicarboxylic acid; and at least 85 mol percent of acid component in the polyester being that of terephthalic acid.

6. A process according to claim 5 which comprises molding and wherein the blending is effected prior to molding.

7. A process according to claim 5 which comprises molding and wherein the blending is effected during molding.

8. A process according to claim 5 wherein the dicarboxylic acid is terephthalic acid and the diol is ethylene glycol.

9. A process according to claim 5 wherein each compound having at least three polyester-forming functional groups is an at least trihydric alcohol.

10. A process according to claim 5 wherein at least one compound having at least three polyester-forming functional groups is a member selected from the group consisting of glycerol, 1,2,4-butanetriol, 1,2,6-hexanetriol, cyclohexane-1,2,3-triol, erythritol, pentaerythritol, cyclohexane-1,2,3,4-tetrol, arabitol and sorbitol.

11. A process according to claim 5 wherein at least one compound having at least three polyester-forming functional groups is an at least tribasic carboxylic acid.

12. A process according to claim 11 wherein the at least tribasic carboxylic acid is a member selected from the group consisting of tricarballylic acid, pentane-1,2,5-tricarboxylic acid, trimellitic acid, naphthalene-1,4,5-tricarboxylic acid, prehnitic acid, mellophanic acid and pyromellitic acid.

13. A process according to claim 5 wherein at least one compound having at least three polyester-forming functional groups is an at least trifunctional hydroxycarboxylic acid.

14. A process according to claim 13 wherein the hydroxycarboxylic acid is a member selected from the group consisting of dihydroxybenzoic acid, racemic acid, citric acid, gentisic acid, ribonic acid, arabonic acid and 2,5-dihydroxyterephthalic acid.

15. A process according to claim 5 wherein the substance which promotes crystallization comprises 0.001 to 1 percent by weight of the polyester and contains at least one solid selected from the group consisting of calcium carbonate, calcium silicate, calcium sulfate, calcium oxalate, magnesium silicate, magnesium stearate and talcum powder.

16. A process according to claim 5 wherein the substance which promotes crystallization comprises at least one high-molecular weight solid selected from the group consisting of polyolefin, polystyrene and copolymer of polyolefin and polystyrene.

17. A process according to claim 5 wherein the substance which promotes crystallization comprises 0.001 to 1 percent by weight of the polyester and contains at least one low-molecular weight liquid selected from the group consisting of benzophenone, tetrahydronaphthalene, tetrachlorethane, dioxane, aniline and m-cresol.

* * * * *

PO-1050
(5/69)

UNITED STATES PATENT OFFICE
CERTIFICATE OF CORRECTION

Patent No. 3,673,139   Dated June 27, 1972

Inventor(s) JOSEPH HRACH

It is certified that error appears in the above-identified patent and that said Letters Patent are hereby corrected as shown below:

Covering page, immediately below line 8, "[21] Appl. No.: 26,114" insert --[32] Priority April 17, 1969
[33] Austrian
[31] A 3708/69--.

Signed and sealed this 29th day of May 1973.

(SEAL)
Attest:

EDWARD M. FLETCHER, JR.
Attesting Officer

ROBERT GOTTSCHALK
Commissioner of Patents